Figure 1:
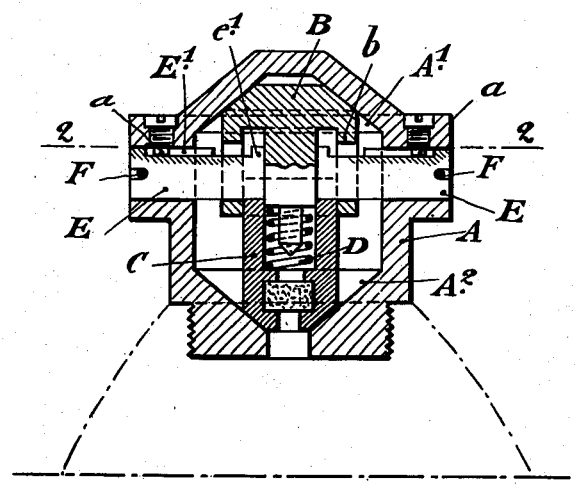

Nov. 17, 1925.

N. E. METHLIN

FUSE

Filed April 4, 1925  6 Sheets-Sheet 1

1,561,878

Inventor
Nicolas Emilien Methlin
By Mauro, Cameron, Lewis & Kerkam
Attorneys.

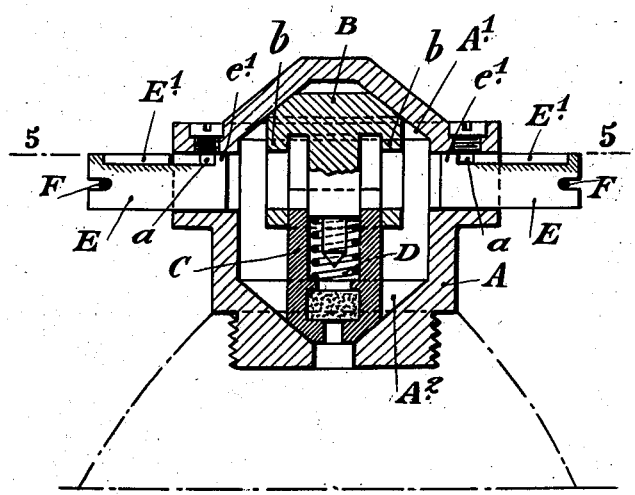
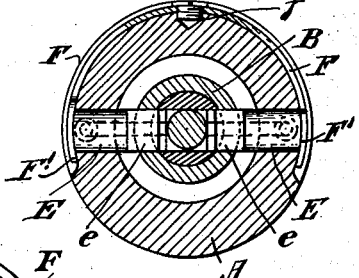
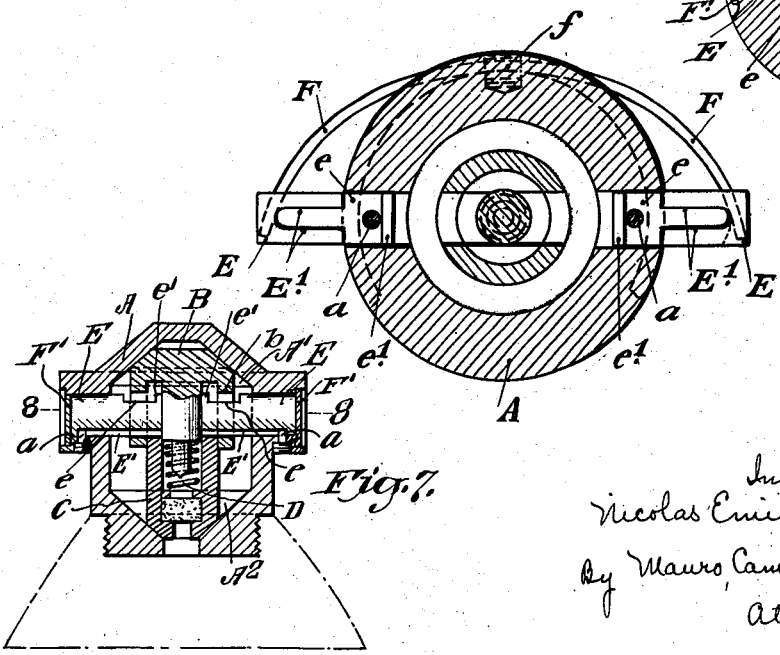

Nov. 17, 1925.   1,561,878
N. E. METHLIN
FUSE
Filed April 4, 1925   6 Sheets-Sheet 3

Inventor
Nicolas Emilien Methlin
By Mauro Cameron Lewis & Kerkam
Attorneys

Nov. 17, 1925.
N. E. METHLIN
FUSE
Filed April 4, 1925
1,561,878
6 Sheets-Sheet 4

Nov. 17, 1925.
N. E. METHLIN
FUSE
Filed April 4, 1925
1,561,878
6 Sheets-Sheet 5

Nov. 17, 1925.                                                1,561,878
N. E. METHLIN
FUSE
Filed April 4, 1925                     6 Sheets-Sheet 6

Patented Nov. 17, 1925.

1,561,878

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT-STOCK COMPANY OF FRANCE.

FUSE.

Application filed April 4, 1925. Serial No. 20,819.

*To all whom it may concern:*

Be it known that I, NICOLAS EMILIEN METHLIN, a citizen of the Republic of France, resident of Paris, France, have invented new and useful Improvements in or Relating to Fuses, which is fully set forth in the following specification.

This invention relates to improvements in the known forms of fuses comprising a detonator holder and a striker body one of which is enclosed by or enters into the other, in order to provide a mutual guidance, each of these members of the firing mechanism being provided with a head the external surface of which is frusto-conical in shape or in the shape of a spherical cap, by means of which head it bears against the internal surface of a chamber or cup of corresponding shape constituted by the fuse body.

In such fuses, use has already been made of safety members, during transport and while the projectile is accelerating when it is fired, consisting of locking bolts which can be displaced radially, and which prevent the striker and the detonator from coming into untimely contact with each other, these locking bolts being removed for the arming of the fuse by the action of the centrifugal force. In order to prevent these locking bolts from being released too soon, auxiliary members are most frequently employed, such as rings or cotters which only release the radially movable locking bolts at the moment when the acceleration of the projectile ends.

In conformity to the invention the locking bolts are secured by one of the members of the firing mechanism (striker body for instance), by the displacement of this member due to its inertia, when the shot is fired, this member and the locking bolts which are displaced radially being suitably arranged so that they engage with each other, the locking bolts being released when the acceleration ends by the return of the said member of the mechanism, that is to say by the return of the striker body, for example, into its initial position, due to the expansion of the spring which normally separates the two members of the mechanism.

Various practical forms of construction of the invention are illustrated, by way of example, in the accompanying drawings in which:

Figures 1 to 6 illustrate a first form of construction of the invention.

Figure 2:
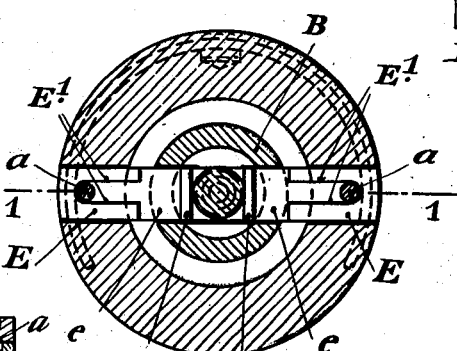
Figure 6:
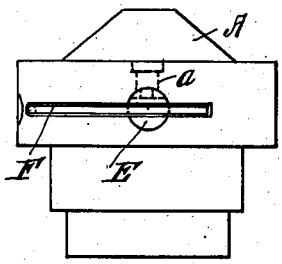
Figure 3:
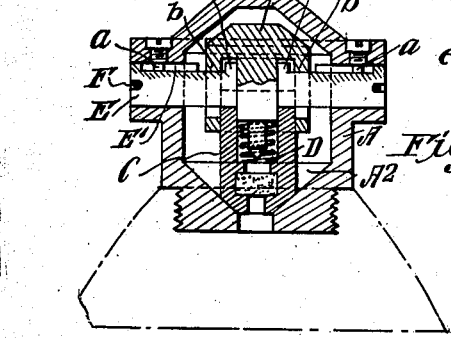

Figure 1 is a longitudinal sectional elevation taken along the line 1—1 in Figure 2, which is a plan section taken along the line 2—2 in Figure 1. Figures 3 and 4 are longitudinal sectional elevations analogous to that shown in Figure 1, showing the members in two other working positions. Figure 5 is a plan section, taken along the line 5—5 in Figure 4. Figure 6 is an elevation, seen from the left or the right in Figure 2.

Figure 11:
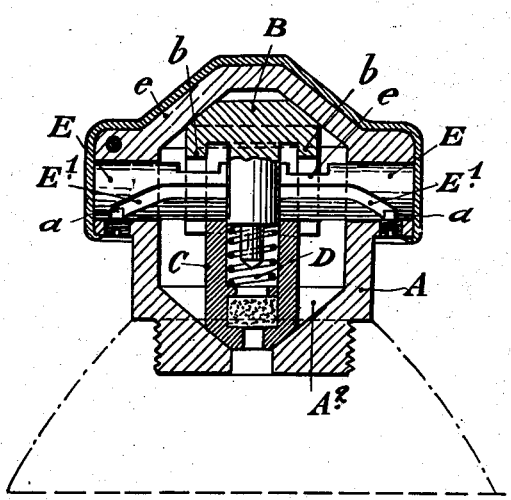
Figure 12:
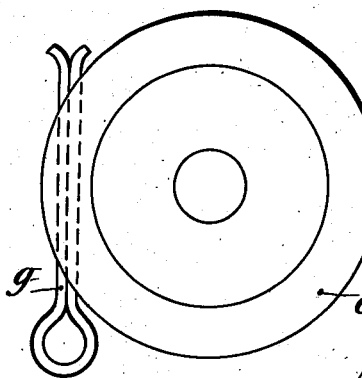
Figure 10:
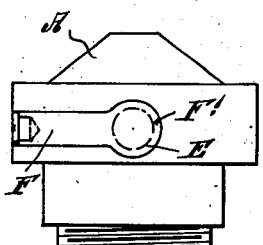
Figure 9:
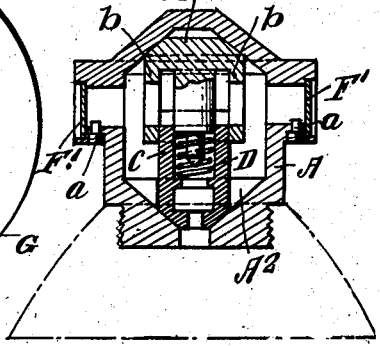
Figure 13:
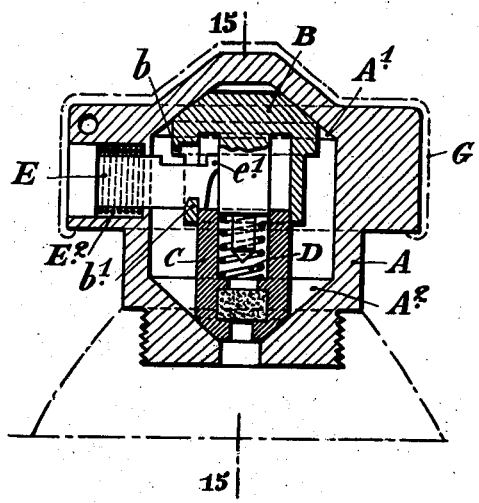
Figure 21:
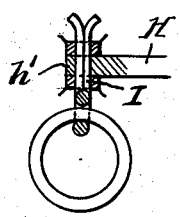
Figure 19:
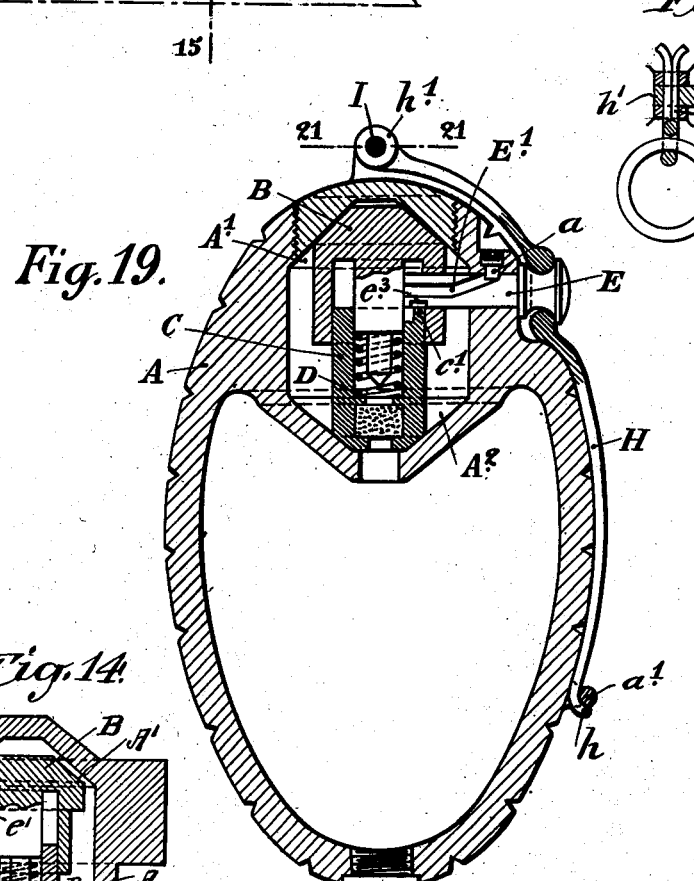
Figure 14:
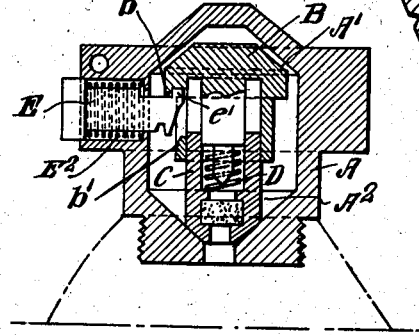
Figure 15:
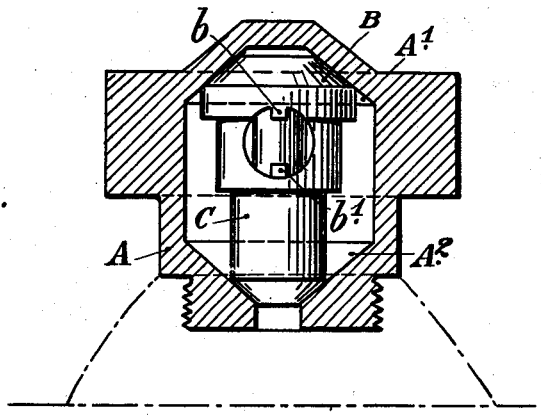
Figure 20:
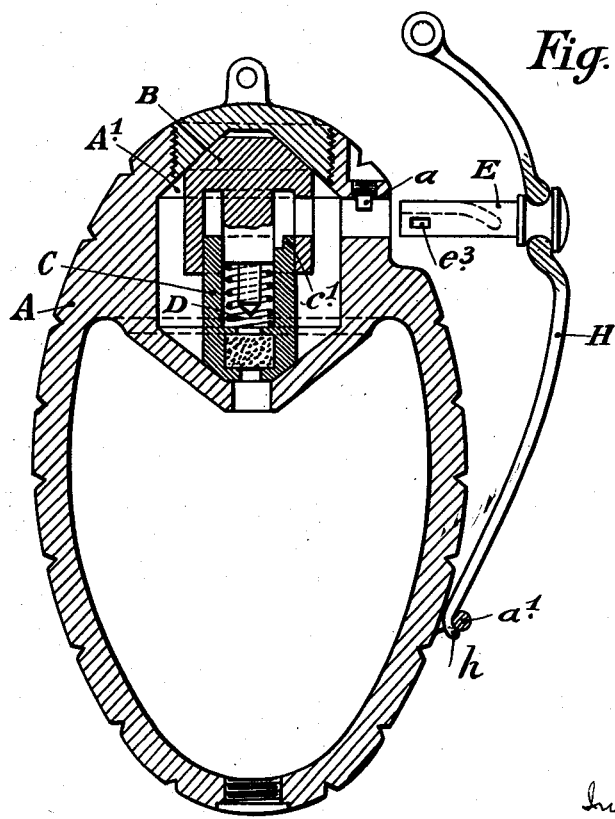
Figure 16:
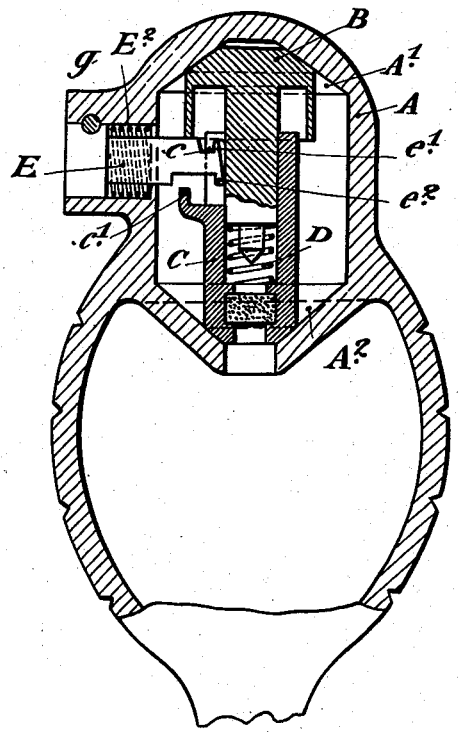
Figure 17:
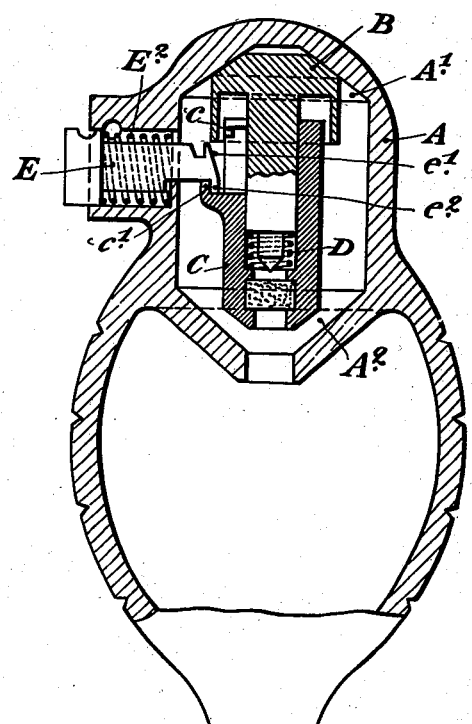
Figure 18:
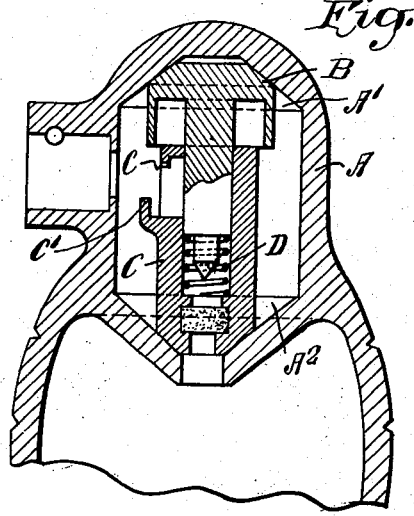

Figs. 7 to 10 inclusive illustrate a second embodiment of the present invention, Fig. 7 being a sectional elevation showing the elements in their normal position, Fig. 8 a sectional view taken on the line 8, 8 of Fig. 7, Fig. 9 a view similar to Fig. 7 showing the position of the elements after the locking bolts have been thrown out, and Fig. 10 a side elevation;

Figs. 11 and 12 illustrate in longitudinal sectional elevation and plan respectively, another embodiment of the present invention;

Figs. 13, 14, and 15 are sectional side elevations illustrating another embodiment of the present invention;

Figs. 16, 17, and 18 are sectional side elevations illustrating one form of the present invention particularly adapted for use in hand grenades;

Figs. 19 and 20 are sectional side elevations illustrating a further embodiment of the present invention particularly adapted for use in hand grenades; and Fig. 21 is a detail sectional view taken on the line 21, 21 of Fig. 19.

Referring to the embodiment of the invention illustrated in Figs. 1 to 6 inclusive, A is the fuse body comprising supporting cups with frusto-conical surfaces $A^1$, $A^2$ for receiving the striker body B and the detonator holder C respectively, one of which is enclosed by and enters into the other so that they are mutually guided. A spring D normally separates the members C and B and causes them to bear against the surfaces of the cups $A^1$ and $A^2$. The fuse comprises, also according to a known principle, safety members such as the locking bolts E arranged so that they can move radially outwards, under the action of the centrifugal force, during the flight of the projectile.

In conformity to the invention, the said locking bolts and the front member of the firing mechanism, in the case in point the striker body B, are so arranged that they engage with each other upon the firing of the shot, due to the inertia of the said striker body. For this purpose, each of the locking bolts E may comprise a notch $e$ where it engages in the striker body B, so that the latter holds a head $e^1$ on the locking bolt during the whole of the time acceleration takes place. The locking bolts E may be guided, by means of a groove $E^1$ on a projection provided on the fuse body and formed for example by a screw $a$. These locking bolts may also be normally secured inside the fuse body by flexible supporting arms F, consisting for example of the arms of a spring, secured at is centre $f$ upon the fuse body.

The members normally occupy the positions shown in Figures 1, 2 and 6. When the shot is fired, the inertia of the striker body B tends to cause it to lag behind, and it is thus brought into the position shown in Figure 3, in which it holds, by means of the upper edges $b$ of apertures through which the ends of the locking bolts E pass, the heads $e^1$ of these bolts, which prevents any untimely movement of the latter. As soon as the acceleration ends, the spring D forces the striker body back into its initial position, so that the locking bolts E become free to move radially, and they do so under the action of the centrifugal force and arrive in the position shown in Figures 4 and 5. The locking bolts which, at rest and during the acceleration period, prevent any forward movement of the detonator holder C, then release the latter and, when the projectile strikes an obstacle, allow the detonator holder to move forward by its own inertia, the spring D being compressed.

The mechanism operates, in the known manner and due to the frusto-conical shape of the members, and to the freedom of movement they possess in making contact with the movable cups $A^1$, $A^2$ whatever be the inclination of the projectile relatively to the obstacle, in other words whatever part of the projectile strikes the obstacle.

Referring to the embodiment of the invention illustrated in Figs. 7 to 10 inclusive, the locking bolts are guided by means of a groove $E^1$ provided on their lower faces, and the locking bolts are secured in the fuse body by means of the arms F of a flat spring secured at its centre $f$ to the fuse body A. In this case the locking bolts, instead of being held in an extreme position, when they move outwards, are released entirely from the fuse body. Each of the arms F of the flat spring terminates at its free end in an expanded circular part $F^1$, which, after the locking bolts have been thrown out, acts as an obturator as shown in Figure 9.

In the form shown in Figs. 11 and 12 the locking bolts E are normally held in place by the cap G which is itself secured to the fuse body A by a split pin $g$. Before loading the projectile into the gun, the pin $g$ and the cap G are removed. In order to prevent the locking bolts E from coming out too soon a helicoidal guideway $E^1$ may be provided for each of them.

Referring to the embodiment of the invention illustrated in Figs. 13 to 15 inclusive, the locking bolts E are normally secured in the fuse body by a cap G, shown in dot and dash lines, analogous to that shown in Figures 11 and 12, the cap itself being secured and held in place by a pin $g$. Each of the locking bolts is acted upon by a spring $E^2$ which tends to force it outwards. The end of the bolt is hooked by means of a notch $e^2$ on a nose $b^1$ formed on the striker body B, while a nose $b$ formed on the latter engages, when the shot is fired, behind the upper head $e^1$ of each of the locking bolts.

When the shot is fired, each of the noses or beaks $b$ moves, due to the inertia of the striker body, in front of the heads $e^1$, the bolts having commenced to move outwards under the action of the springs $E^2$ as shown in Figure 14, this outward movement being made possible by the downward movement of the beaks $b^1$, which downward movement releases the notches $e^2$. As soon as the acceleration ends, the spring D returns the striker body B into its original position, and the locking bolts are ejected, the springs $E^2$ expanding. It has been assumed, for the sake of simplicity, that the locking device is formed of a single bolt, but it is evident that two locking bolts diametrically opposite may be provided, or again even a greater number of bolts.

Referring to the embodiment of the invention illustrated in Figs. 16, 17, and 18, the front part of the grenade forms the fuse body A, with the supporting cups $A^1$ and $A^2$ which receive the striker body B and the detonator holder C respectively. The locking bolt E, acted upon by a spring $E^2$, as in the preceding example is normally secured to the body of the grenade by a split pin $g$.

It is hooked, by a beak $e^1$, behind a hook $c$ formed on the detonator holder, and comprises a second lower beak $e^2$ in front of which a second hook $c^1$ formed on the said detonator holder is brought when the detonator holder has moved forward due to the backward movement of the bomber's arm, as shown in Figure 17. When the bomber has thrown the grenade, the spring D brings the detonator holder C back to its initial position which causes the locking bolt E to be released, and it is then ejected by the spring $E^2$.

It will be noted that any untimely bursting of the grenade, if it falls near the bomber after the pin $g$ has been removed, cannot take place as the detonator holder C immediately engages with the locking bolt E, two operations being necessary for the arming of the grenade, comprising first a forward movement of the detonator holder followed by a return movement of the latter in a backward direction.

In the form shown in Figs. 19 to 21 inclusive, the locking bolt E is provided with a helical groove $E^1$ in which engages screw $a$ carried by the body of the grenade, a slot $e^3$ being provided on the lower part of the locking bolt E in which a hook $c^1$ formed on the detonator holder C engages when the grenade is thrown. The locking bolt is normally secured in its seating by an external spring H, which is pivotally mounted in a ring $a^1$ provided on the body of the grenade, while the said spring is secured to and held in contact with the body of the grenade by a pin I.

If the grenade falls at the feet of the bomber any untimely bursting is prevented by the braking effect of the helical groove $E^1$ which prevents the locking bolt E from moving out too quickly. As long as this braking effect lasts the members B and C cannot move towards each other, and as soon as the locking bolt is released from the striker body B, the effects of the shock have ceased, and the spring D suffices to keep the members of the firing mechanism separated.

Having now particularly described and ascertained the nature of my said invention and in what manner the same is to be performed, I declare that what I claim is:—

1. A fuse for a projectile comprising a body portion having a chamber formed therein, a detonator holder and a striker having telescopic engagement, one with the other, mounted in said chamber, and one or more radial locking bolts having notches therein and normally extending between said holder and striker, one of the latter being adapted for engagement with the notched bolt or bolts to prevent dislodgement of the same during acceleration of the projectile.

2. A fuse for a projectile comprising a body portion having a chamber formed therein, a detonator holder and a striker having telescopic engagement, one with the other, mounted in said chamber, resilient means interposed between said holder and striker, and one or more radial locking bolts having notches therein and normally extending between said holder and striker, one of the latter being adapted for engagement with the notched bolt or bolts to prevent dislodgement of the same during acceleration of the projectile.

3. A fuse for a projectile comprising a body portion having a chamber formed therein, a detonator holder and a striker having telescopic engagement, one with the other, mounted in said chamber, one or more radial locking bolts normally extending between said primer holder and striker, one of the latter being adapted for engagement with said bolt or bolts to prevent dislodgement of the same during acceleration of the projectile, and resilient means normally engaging said bolt or bolts.

4. A fuse for a projectile comprising a body portion having a chamber formed therein, a detonator holder and a striker having telescopic engagement, one with the other, mounted in said chamber, one or more radial locking bolts having notches and grooves therein and normally extending between said holder and striker, one of the latter being adapted for engagement with the notched bolt or bolts to prevent dislodgement of the same during acceleration of the projectile, and means fixedly secured to the body portion and extending into the groove in said bolt or bolts.

5. A fuse for a projectile comprising a body portion having a chamber formed therein, a detonator holder and a striker having telescopic engagement, one with the other, mounted in said chamber, one or more locking bolts having notches therein and normally extending between said holder and striker, one of the latter being adapted for engagement with the notched bolt or bolts, and means for yieldingly resisting radial movement of said bolt or bolts.

6. A fuse for a projectile comprising a body portion having a chamber formed therein, a detonator holder and a striker having telescopic engagement, one with the other, mounted in said chamber, locking bolts having notches therein normally extending between said holder and striker, one of the latter being adapted to engage said notched bolts, and resilient means for normally retaining said bolts in the body portion and for closing the bolt openings in said portion after said bolts have been ejected by centrifugal force.

7. A device of the class described comprising a body portion having a chamber therein, a primer holder, a striker having sliding telescopic engagement with the holder, said striker and holder being positioned in said chamber, one or more locking bolts having notches and grooves therein, means secured to the body portion and extending into said grooves, and resilient means secured to the body portion and having engagement with said bolt or bolts for normally maintaining the same between said holder and striker, one of the latter being adapted to engage the notched portion of said bolt or bolts.

In testimony whereof I have signed this specification.

NICOLAS EMILIEN METHLIN.